Aug. 13, 1935.  E. C. HORTON  2,011,364
HORN
Filed June 15, 1933   3 Sheets-Sheet 1
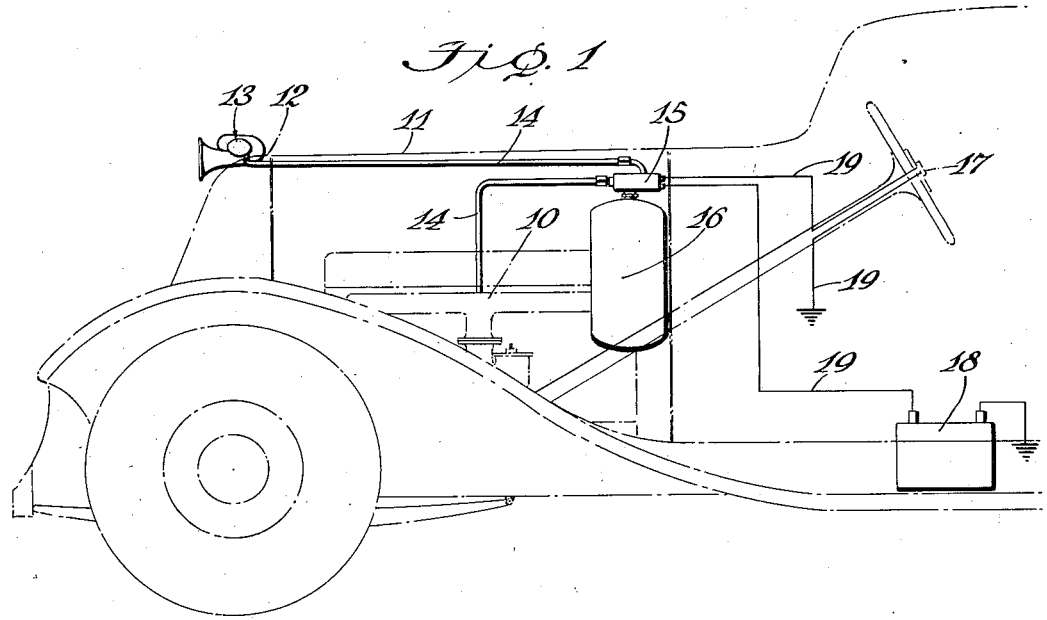
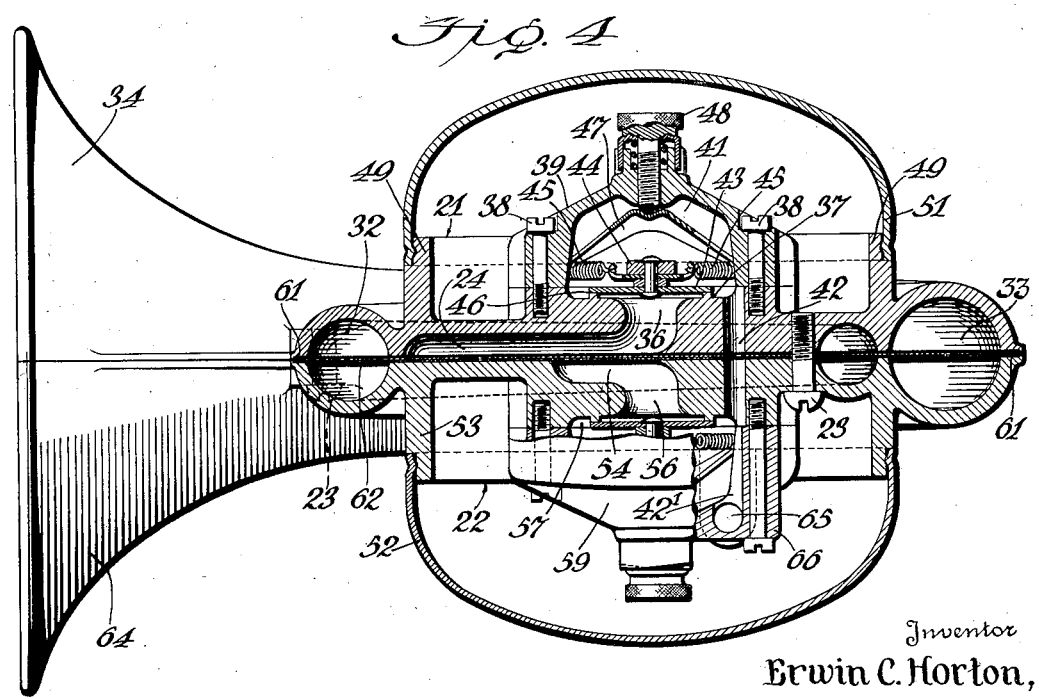
Inventor
Erwin C. Horton,
By Beau & Brooks, Attorneys Aug. 13, 1935.    E. C. HORTON    2,011,364
HORN
Filed June 15, 1933    3 Sheets-Sheet 2

Inventor
Erwin C. Horton,
By Bean & Brooks Attorneys

Aug. 13, 1935.  E. C. HORTON  2,011,364
HORN
Filed June 15, 1933  3 Sheets-Sheet 3
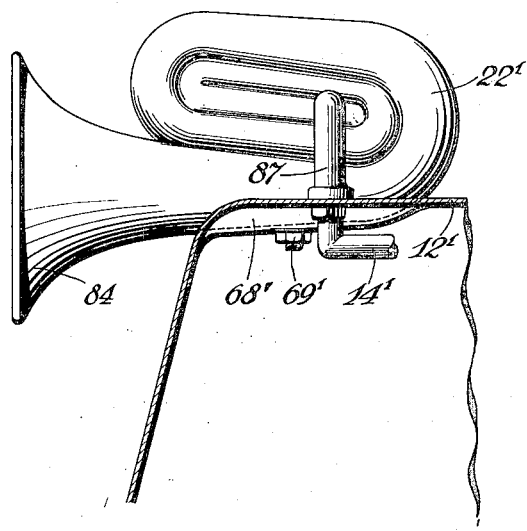
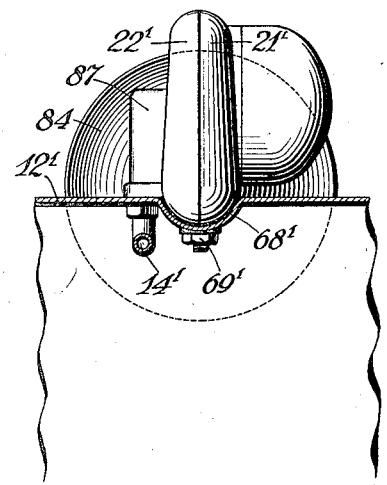
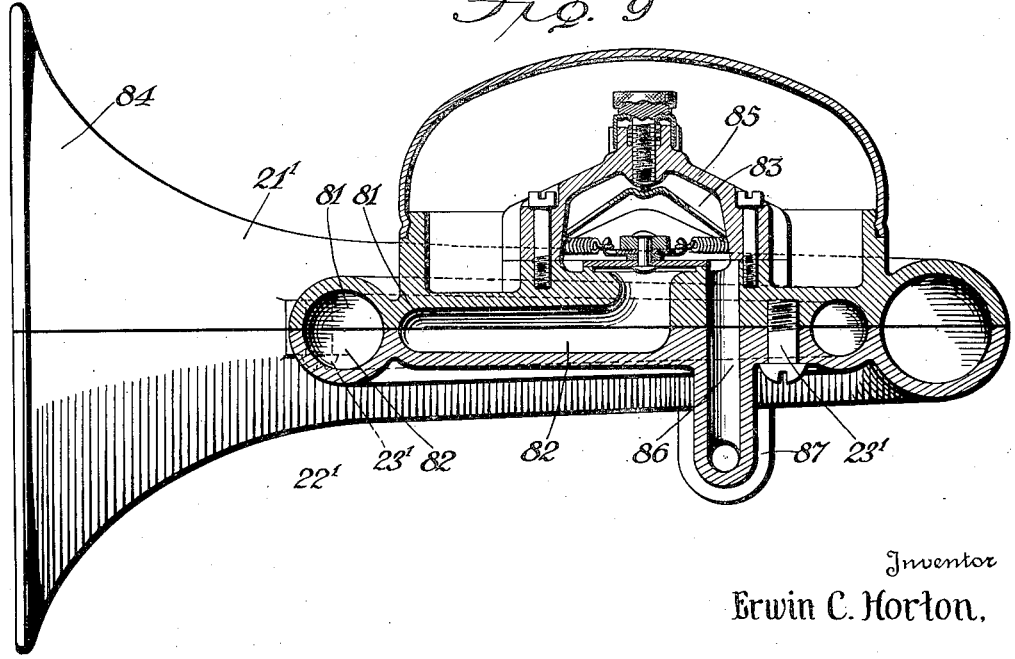
Inventor
Erwin C. Horton,
By Bean & Brooks. Attorneys Patented Aug. 13, 1935

2,011,364

UNITED STATES PATENT OFFICE 2,011,364

HORN

Erwin C. Horton, Hamburg, N. Y., assignor to Trico Products Corporation, Buffalo, N. Y.

Application June 15, 1933, Serial No. 676,005

10 Claims. (Cl. 116—138)

The present invention relates to motor vehicle signal devices and mountings therefor, and particularly to such devices as are of the horn type for sounding warning notes.

Signal horns now in use are conventionally mounted beneath the engine hood of the vehicle, or are supported on the exterior of the hood or adjacent one of the vehicle head-lamps. When mounted under the hood, the directional quality of the horn is sacrificed, metallic portions of the vehicle serving to deflect the sound waves, and when conventional exterior mountings are employed, the horn provides additional frontal area increasing the air resistance to forward motion of the vehicle. Further, such exteriorly mounted horns somewhat detract from the appearance of modern motor vehicles, breaking up the smooth and sweeping contours of the exposed metal surfaces.

Further, with exteriorly mounted horns, particularly of the suction, air pressure, or other types having air passages or moving parts (as the valve mechanism of a fluid pressure horn or vibrator of an electrical horn), snow and ice frequently interfere with or stop operation, such frozen moisture either forming a stoppage in an air or sound passage or binding a moving part.

The present invention contemplates mounting the horn above and in adjacency with the upper portion of the cooling radiator of the vehicle engine, which is ordinarily one of the hottest portions of the cooling system. Thereby heat from the radiator will heat the interior of the horn, preventing the accumulation of such frozen moisture as would interfere with operation. Further, the invention contemplates a horn of ornamental character, adapted to replace the ornamentation usually provided at the fore portion engine hood or the upper portion of the radiator shell. Thereby the additional frontal area caused by a horn is at least partially eliminated, the vehicle body design is not interfered with, and maximum directional characteristics are obtained since the horn is positioned at a relatively high elevation and is free from any shielding effect by other parts of the vehicle.

The invention further relates to improvements whereby a plurality of comparatively long air columns are provided within a compact body, so that a plural tone signal may be sounded, the air columns being preferably of such relative lengths that a blended or harmonized musical chord is created.

These and other objects and advantages, including those arising from the formation and arrangement of component parts which render the device practical in operation and economical of manufacture, will become apparent from the following description of the typical embodiments of the invention illustrated in the accompanying drawings, wherein:

Fig. 1 is a diagrammatic side elevational view illustrating a horn signal system installed in a vehicle in the manner of the present invention;

Fig. 4 is a horizontal section taken approximately along line 4—4 of Fig. 2;

Figure 5:
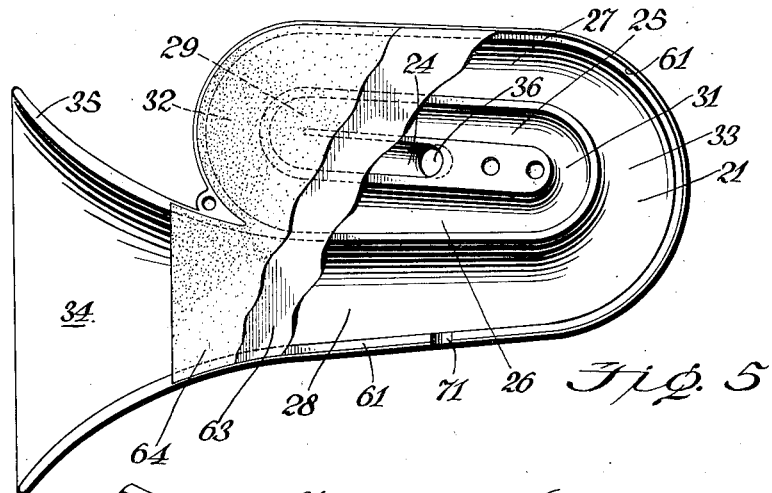
Figure 6:
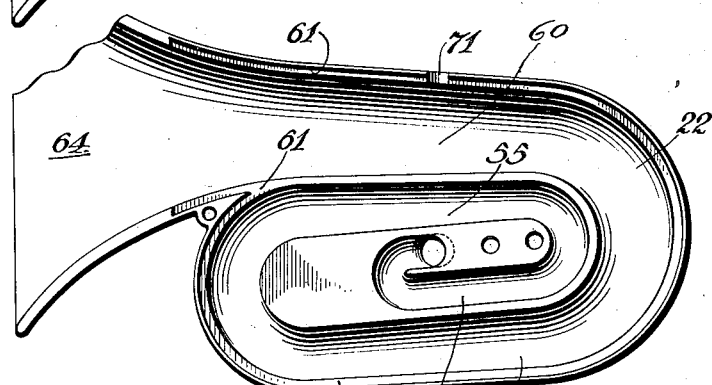
Figure 2:
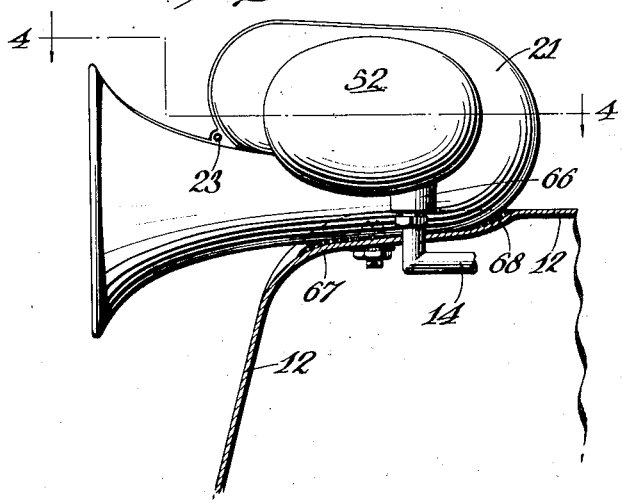
Fig. 2 is a side elevation of the horn unit shown in Fig. 1, the adjacent supporting portion of the vehicle appearing in vertical section.
Figure 3:
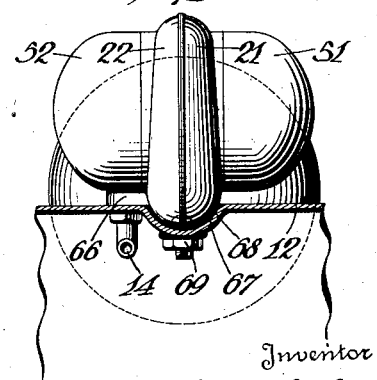
Fig. 3 is a rear view of the device shown in Fig. 2.

Figs. 5 and 6 are side elevational views of casing parts of the device of Figs. 2, 3 and 4; and Figs. 7, 8 and 9 are similar to Figs. 2, 3 and 4 respectively, but illustrating a modified horn construction.

As shown in Fig. 1, the motor vehicle, illustrated by broken lines, includes an engine with intake manifold 10, a hood 11 covering the engine and including a forward portion or a radiator shell 12. The signal system illustrated includes a suction operated horn 13 mounted upon the shell portion 12, at the upper central portion thereof, and a suction conduit 14, 14 providing fluid communication between the horn and intake manifold 10. Interposed in conduit 14, 14 is an electrically actuated valve 15 for controlling passage of fluid from the horn to the intake manifold, a suction reservoir 16 being preferably associated with the valve to enable operation of the horn when manifold suction is insufficient. The valve may be opened to cause the horn to operate by closing a horn button or switch 17 in the driver's compartment and which is in electrical circuit with the valve 15 and a battery 18 through the agency of wires 19 and grounds.

The horn 13 includes a pair of complementary, preferably die cast, metallic sections 21 and 22 (Figs. 5 and 6 respectively) secured together by fasteners 23. The inner face of section 21 has a plurality of substantially parallel recesses or troughs 24, 25, 26, 27 and 28 of semi-circular cross-section and of increasing width or diameter and joined at their ends by substantially semi-circular trough portions; semi-circular trough portion 29 joining troughs 24 and 25, portion 31 joining troughs 25 and 26, 32 joining 26 and 27, and 33 joining 27 and 28. Trough 28 merges into a semi-bell shaped recess 34 formed in the forward end 35 of section 21. A continuous trumpet passage beginning with the narrow inner trough 24, continuously increasing in cross-sectional area, and terminating in the enlarged bell portion 34 is thereby provided. The passage thus formed is of comparatively great length, although the overall length of the section 21 is small.

The inner end of trough 24 merges into a transverse opening 36 terminating on the outer face 37 of section 21. Secured against the face 37 by fasteners 38 is a casing section 39 cooperating with section 21 to provide a valve chamber 41. Passage 42 in section 21 provides an air outlet from chamber 41 and is in communication with conduit 14 and the source of suction as will be explained hereinafter. Valve means in chamber 41 for alternately opening and restricting fluid passage from the trough 24 to conduit 14 comprise a valve 43 carrying a weight 44, and radially extending springs 45 for suspending the valve and lightly pressing it against an annular seat 46 formed on section 21 about opening 36, the springs being anchored to the walls of the chamber.

In order to permit variation of the pressure with which the valve is pressed against seat 46, a spider 47 is arranged to engage the springs medially of their ends. This spider, like that disclosed in Patent No. 1,822,579 granted September 8, 1931, is engaged by a shank threaded through casing section 39 and has an adjusting head 48 exterior of section 39. By rotating the adjusting head, the pressure on the valve may be varied.

Spaced from section 39 and extending therearound is a flange 49 formed on section 21 and recessed about its outer edge to receive a snap on cover 51 which conceals the adjusting means 48 and the fasteners 23, 38, the latter being readily accessible upon removal of the cover.

Section 22 is generally similar to section 21, having its inner face provided with connected trough sections 54, 55, 56 and 60 of increasing cross-sectional area. Trough 60 merges into a bell-like portion 64 similar to portion 34, and trough 54 merges into a transverse opening 56 which extends into a chamber 57 formed by a casing section 59 similar to section 39. The passage provided by the trough portions in section 22, however, is shorter than that in section 21. The valve means in chamber 57 are substantially identical to those in chamber 41 and hence need not be described in detail, and the cover 52 engaging flange 53 on section 22 is identical with cover 51.

An opening 42' in section 22 provides a continuation for passage 42, so that both chambers 41, 57 communicate with passage 65 formed in enlargement 66 on casing section 59 which passage communicates with suction conduit 14.

As shown in Figs. 4, 5 and 6 the metal at the edges of sections 21 and 22 adjacent the troughs is recessed as indicated at 61 to receive a web 62 when the sections are assembled. The web, which may comprise a thin sheet of metal 63 having a layer of gasket material 64 on each face thereof, separates the trough portions of the respective sections 21 and 22, so that two separate sound passages are provided in the device from the chambers 41, 57 to the common bell provided by portions 34, 64.

In operation, upon closing of the horn button or switch 17, to open valve 15 in the suction conduit, air under atmospheric pressure will flow through the trumpet passages and continuing passages in the horn body into the conduit 12 and thence to the source of suction. This flow will be interrupted at high frequencies by the valves, as valve 43, in chambers 51 and 57, in the manner described in the aforementioned Patent No. 1,822,579, to set up sound producing oscillation of the air columns in the trumpet passages. The rate or periodicity of oscillation of each valve may be varied by the adjusting means, as 48, so that the sound pulsations set up will be in resonance with the associated trumpet passage, i. e., the valve in chamber 41 with the trumpet passage in section 21 and the valve in chamber 57 with the trumpet passage in section 22, whereby a powerful sound signal is produced, the signal being of two tones when the trumpet passages are of unequal effective length.

In mounting the horn in accordance with the instant invention, the forward portion of the engine hood, or radiator shell, designated 12, may be recessed, as indicated at 67 (Figs. 2 and 3) to receive and seat the lower, generally semi-cylindrical surface of the horn body, a pad of felt 68 or like vibration and sound insulating material being interposed. To effect a positive connection between the horn and vehicle, a fastener 69 may be extended through the latter. In the illustrated embodiment, the enlarged head of the fastener may seat in a recess provided by depressions 71 formed in horn sections 21 and 22, as shown in Figs. 5 and 6, whereby when the sections are assembled, the fastener is positively engaged with the horn. The insulation is, of course, preferably of such character and size that it will not appreciably interfere with the transfer of heat from the radiator to the horn body.

The modified horn construction depicted in Figs. 7, 8 and 9 is generally similar to that hereinbefore described except that a single sound passage and valve chamber are formed therein. The sections 21' and 22', secured together as by fasteners 23', are provided with trough portions 81 and 82 respectively, which communicate with and complement each other to provide a single, continuous sound or trumpet passage extending from valve chamber 83 to the bell 84. The chamber 83 is formed by a casing member 85 similar to that indicated in Fig. 4 at 39, and the valve mechanism contained therein is substantially identical to that hereinbefore described. The fluid outlet from the chamber, formed by passage 86, extends through sections 21' and 22' and through the enlargement 87, formed on section 22', where it connects the conduit 14' leading to a source of suction. The horn is secured in recess 68' of the vehicle portion 12' by fastener 69' in the same manner as previously described in connection with horn 13.

It will be understood that the devices illustrated and described are merely illustrative of the several features of the invention, which may be embodied in other physical formations within the purview and scope of the invention.

What is claimed is:

1. In combination with a motor vehicle having an engine hood at the forward portion thereof, the forward portion of the radiator hood comprising a radiator shell, said shell having a recess formed in the upper central portion thereof, a horn having a forwardly opening trumpet passage, the lower portion of said horn being seated in said recess, a fastener extending through the shell for securing the horn to said shell, and a layer of sound deadening material in said recess between the horn and said shell.

2. In combination with a motor vehicle having an engine hood at the forward portion thereof, said hood having a recess in the upper central and forward portion thereof, a horn having a forwardly opening trumpet passage, the lower portion of the horn body being seated in said recess, and a relatively thin layer of sound absorbing material inserted between the adjacent surface of horn body and hood.

3. In combination with a motor vehicle having an engine hood at the forward portion thereof, said hood having a recess in the upper central and forward portion thereof, a horn having a forwardly opening sound passage therein, and said horn being mounted on said hood with the lower portion thereof seated in said recess.

4. In a multi-tone signal device operable by suction, a pair of juxtaposed body sections each having an end portion of semi-bell shape, the two end portions constituting a sound opening, and each body section having a trough formed on the inner face thereof of substantially convolute form terminating in a transverse opening through the body section, a casing section secured to the outer face of each body section over said opening and forming with the body section a chamber for sound-producing valve mechanism, and a web member disposed between the troughed portions of said body sections to provide a wall between the troughs of the two sections whereby plural sound passages are provided, said body sections being recessed adjacent the edges thereof to receive said web, and the latter being of relatively thin sheet material with a layer of gasket material on both faces thereof.

5. In a multi-tone signal device, a pair of juxtaposed body sections each having an end portion of semi-bell shape, the two end portions constituting a sound opening, and each body section having a trough formed on the inner face thereof of substantially convolute form terminating in a transverse opening through the body section, a casing section secured to the outer face of each body section over said opening and forming with the body section a chamber for sound generating mechanism, and a plate disposed between the troughed portions of said body sections to provide a wall between the troughs of the two sections, and the latter being recessed adjacent their edges to provide a channel to receive said plate.

6. In a multi-tone signal device, a pair of juxtaposed body sections each having an end portion of semi-bell shape, the two end portions constituting a sound opening, and each body section having a trough formed on the inner face thereof of substantially convolute form terminating in a transverse opening through the body section, a casing section secured to the outer face of each body section over said opening and forming with the body section a chamber for sound generating mechanism, and a plate disposed between the troughed portions of said body sections to provide a wall between the troughs of the two sections, and the latter being recessed adjacent their edges to provide a channel to receive said plate, and said troughs being of different effective lengths, whereby the air columns therein will be resonant to signal notes of different pitches.

7. In a signal device, a pair of juxtaposed body sections each having in one face thereof a plurality of substantially straight and parallel trough portions therein, and substantially semi-circular trough portions connecting said straight portions to provide a single trough of elongated convolute form, whereby the portion of each section which has the trough portions therein is of substantially oval shape, and a closure member extending between the troughed portions of the sections to separate the troughs of the sections and thereby define plural trumpet passages.

8. In a signal device, a body section in one face thereof having a plurality of substantially straight and parallel trough portions therein, and substantially semi-circular trough portions connecting said straight portions to provide a single trough of elongated convolute form, whereby the portion of the section which has the trough portions therein is of substantially oval shape, and a closure member extending over said one face to provide an elongated trumpet passage.

9. In combination with a motor vehicle having an engine radiator with a covering radiator shell at the forward portion of the vehicle, a suction horn comprising a casing having an open sound passage and housing suction operated sound producing means, said casing being mounted upon the upper central portion of said shell in intimate proximity therewith, whereby heat from the radiator will be transferred to the horn to eliminate the presence of frozen moisture therein.

10. In combination with a motor vehicle having an engine and an engine cooling radiator with a covering radiator shell at the forward portion of the vehicle, a suction operable horn having a suction conduit extending to a source of suction adjacent the engine, said horn being mounted upon the upper central portion of the shell and said conduit extending from the horn body through an aperture in the shell into the space therebeneath, whereby heat from the radiator will be transferred to the horn and conduit to prevent the accumulation of frozen moisture therein.

ERWIN C. HORTON.